May 2, 1961  A. CAMERON-JOHNSON  2,982,499
AIRCRAFT UNDERCARRIAGES
Filed Aug. 10, 1959  5 Sheets-Sheet 2
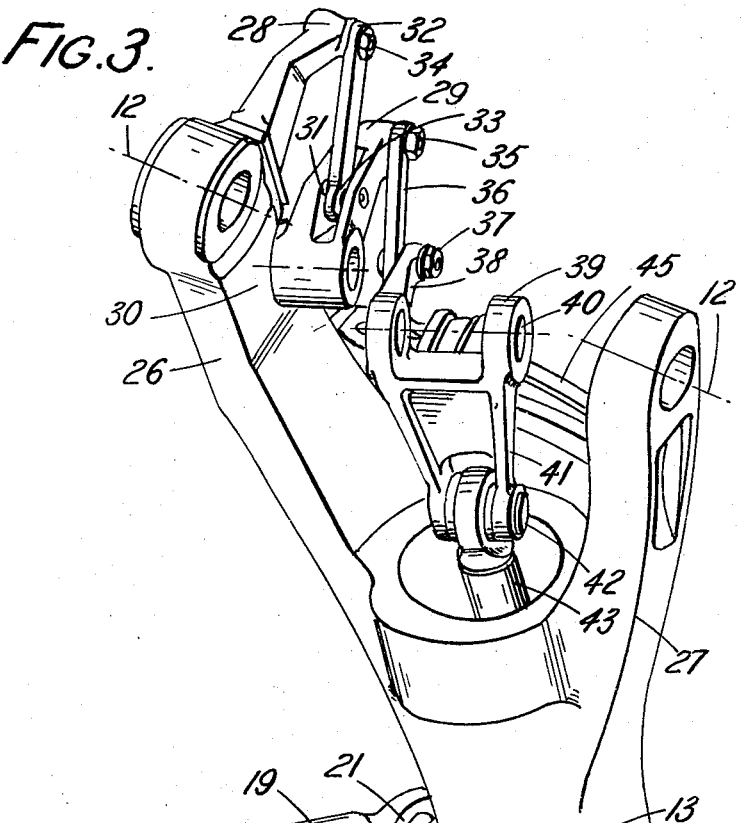
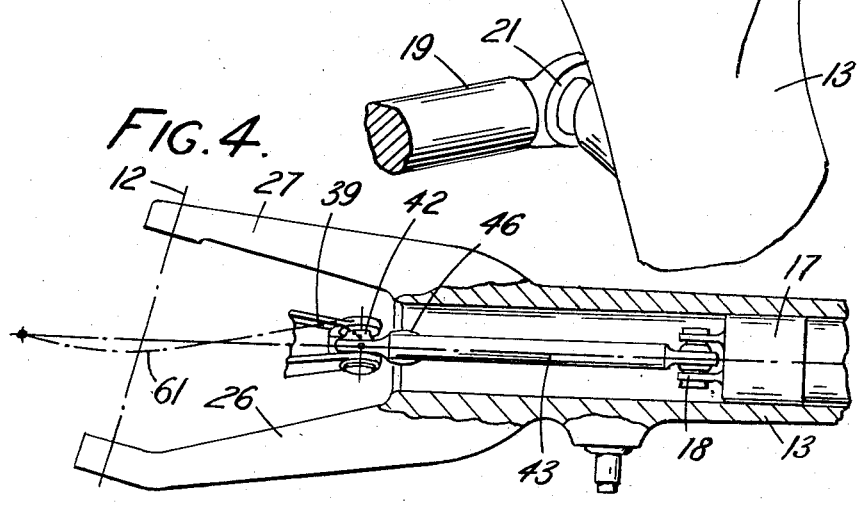
INVENTOR
ALAN CAMERON-JOHNSON
BY Mawhinney & Mawhinney
ATTYS.

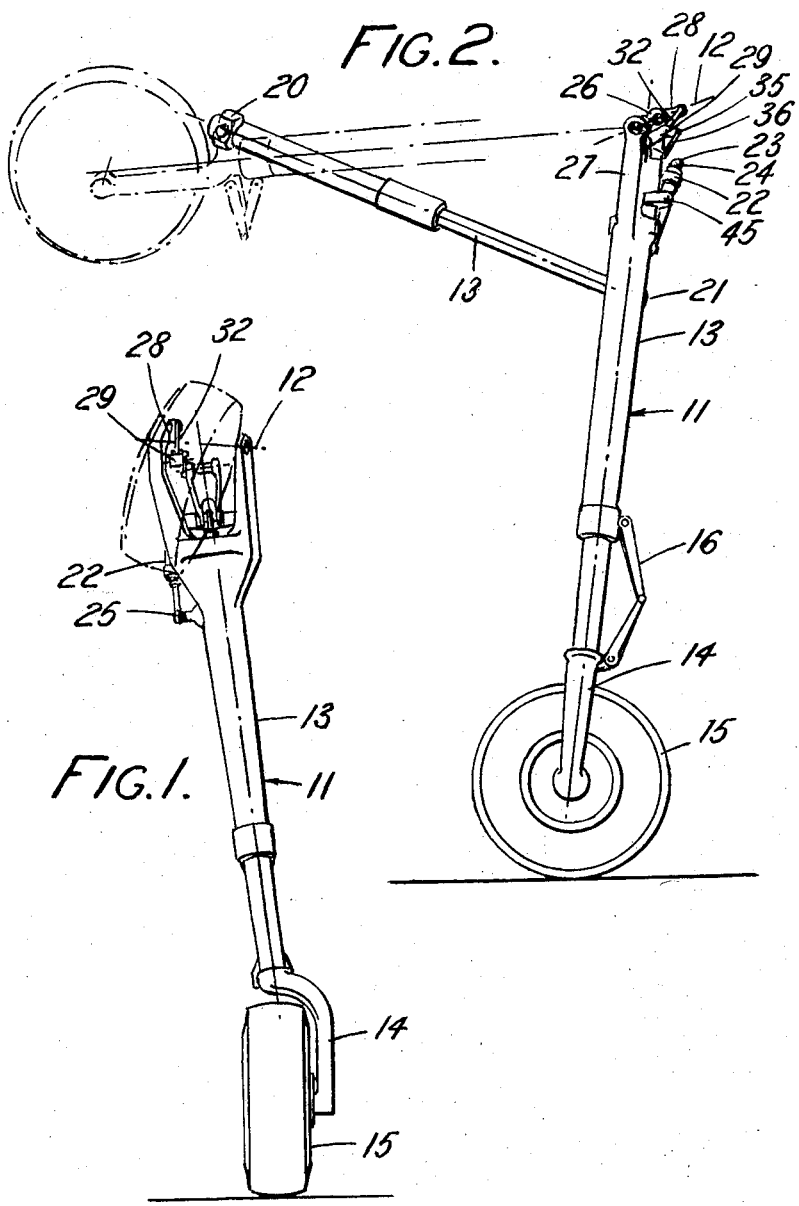

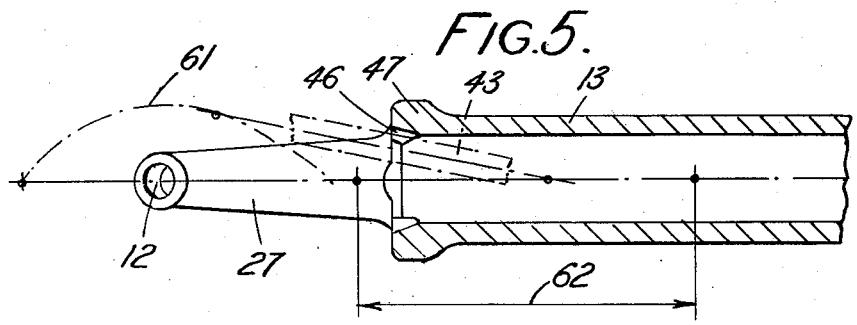
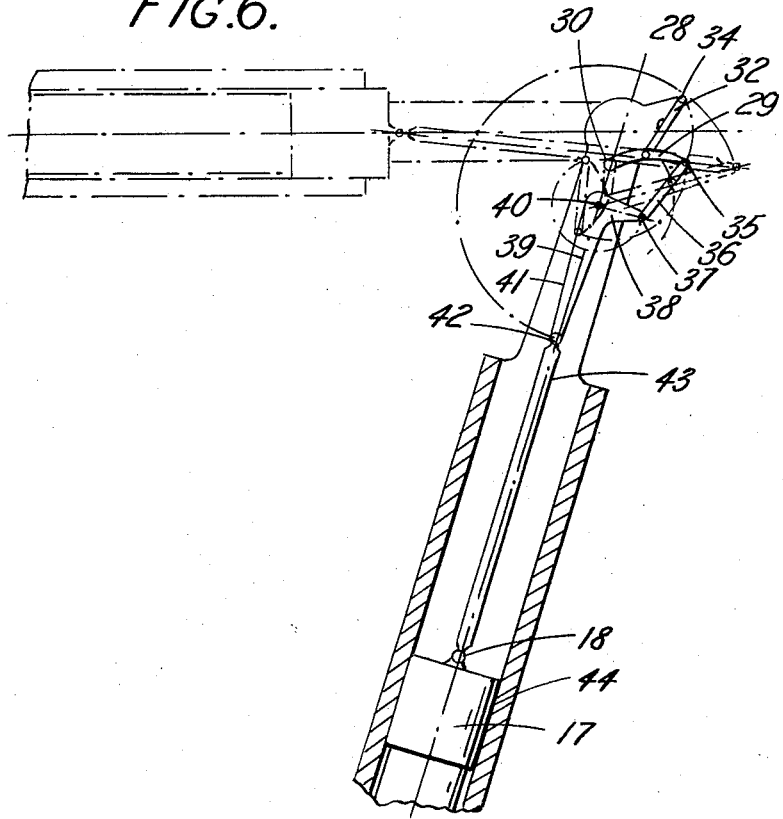

May 2, 1961 A. CAMERON-JOHNSON 2,982,499
AIRCRAFT UNDERCARRIAGES

Filed Aug. 10, 1959 5 Sheets-Sheet 4

INVENTOR
ALAN CAMERON-JOHNSON
BY Mawkenney & Mawkenney
ATTYS

May 2, 1961  A. CAMERON-JOHNSON  2,982,499
AIRCRAFT UNDERCARRIAGES

Filed Aug. 10, 1959  5 Sheets-Sheet 5

INVENTOR
ALAN CAMERON-JOHNSON
BY Mawhinney & Mawhinney
ATTYS

United States Patent Office 2,982,499
Patented May 2, 1961

2,982,499
AIRCRAFT UNDERCARRIAGES
Alan Cameron-Johnson, Gloucester, England, assignor to Rotol Limited, Gloucester, England, a British Company Filed Aug. 10, 1959, Ser. No. 832,824
Claims priority, application Great Britain Aug. 11, 1958
17 Claims. (Cl. 244—102)

This invention relates to aircraft undercarriages, and particularly to retractable aircraft undercarriages in which provision is made for reducing the overall length of the undercarriage leg during retraction so that the leg may be accommodated in a retraction bay of compact dimensions.

The invention is concerned with an aircraft undercarriage of the kind (hereinafter referred to as the kind specified) including a leg which comprises an upper component, one end of which is adapted to form part of a retraction hinge upon an aircraft, a lower component adapted to carry a landing element, for example, a wheel, this lower component being mounted for guided longitudinal displacement with respect to said upper component, and a crank-and-lever mechanism shortening the effective length of the leg upon retraction of the leg.

According to one aspect of the invention, there is provided an aircraft undercarriage of the kind specified comprising at least one pair of crank members each adapted to be pivotally mounted on fixed structure of the aircraft and a connecting link pivoted to and extending between each adjacent pair of crank members, which connecting link is pivoted to one crank member at a radius from the pivot axis of that crank member which is greater than the radius from the pivot axis of the other crank member at which the connecting link is pivoted to the other crank member so that when the crank members are pivotally mounted on the fixed structure of an aircraft and one of the crank members is caused to pivot, then the other crank member of the pair moves through a greater angle than the one crank member, and wherein the crank member arranged to have the least angular movement is connected to move with the upper component of the leg and the crank member arranged to have the greatest angular movement is connected to the lower part of the leg to move it with respect to the upper component of the leg.

Preferably the upper component is hollow and the shock absorbing means comprises a telescopic damper which passes through the interior of said upper component, the damper being displaceable within and relatively to the upper component under the control of the crank-and-lever mechanism during retraction.

According to another aspect of the invention there is provided an aircraft undercarriage of the kind specified wherein the crank-and-lever mechanism comprises a crank formed integrally with the upper end of the upper component and projecting therefrom radially with respect to the retraction hinge axis; a first rocking lever arranged and adapted to be connected at one end with a fixed part of the aircraft structure to pivot about a first axis, which is different from the retraction hinge axis; a first link pivotally connected at one end with the radial outer end of said crank and, at its other end to the first rocking lever at a point intermediate the ends of the first rocking lever; a second link one end of which is pivotally connected with the end of said first rocking lever remote from the first axis; a second rocking lever in the form of a bell crank or the like adapted and arranged to be connected near its centre to a fixed part of the aircraft structure to pivot about a second axis, which is different from the retraction hinge axis and the first axis, one end of said second rocking lever being pivotally connected with the end of said second link remote from the first rocking lever and the other end of said second rocking lever which is more remote from the second axis than the one end being connected to a third link which in turn is connected to the lower part of the leg.

Preferably locking means are provided to maintain said crank-and-lever mechanism in a rigid state when in the leg extended position, said locking means being releasable during the initial movement of the leg retracting mechanism.

One embodiment of the invention will now be described by way of example with reference to the accompanying diagrammatic drawings in which:

Figure 1 shows, in front elevation, an undercarriage retraction mechanism of the invention;

Figure 2 shows a side elevation of this undercarriage retraction mechanism;

Figure 3 shows, in isometric view, details of the crank-and-lever mechanism incorporated in this undercarriage retraction mechanism for effecting undercarriage contraction;

Figures 4 and 5 show the upper component of the undercarriage leg in cross section in two planes;

Figure 7:
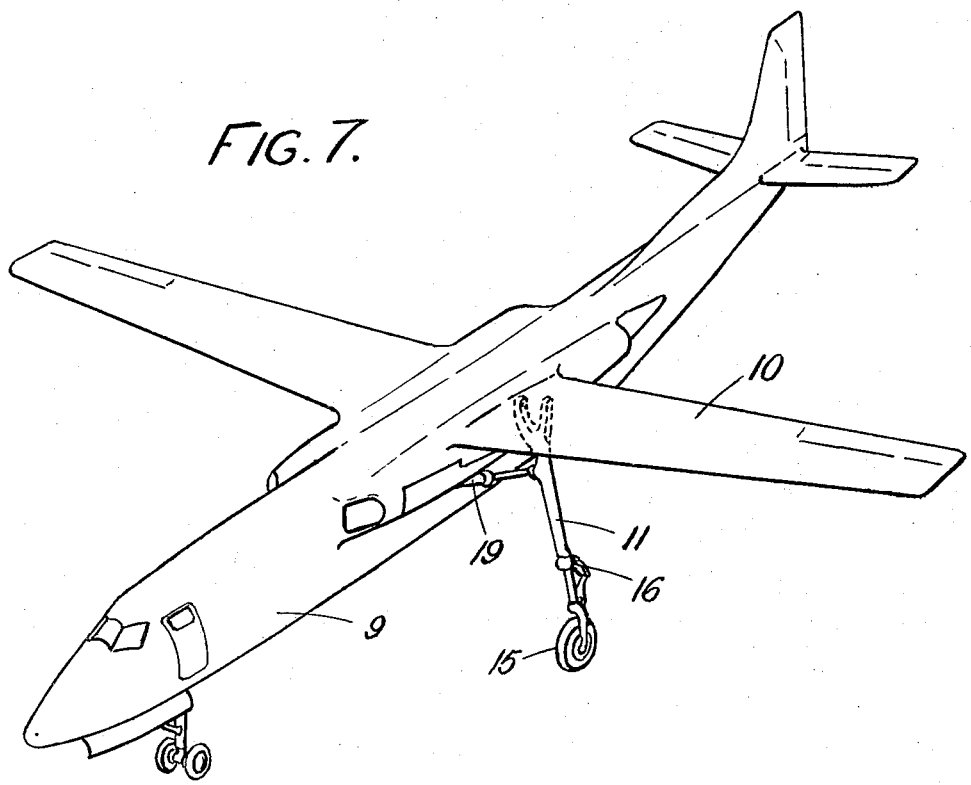
Figure 8:
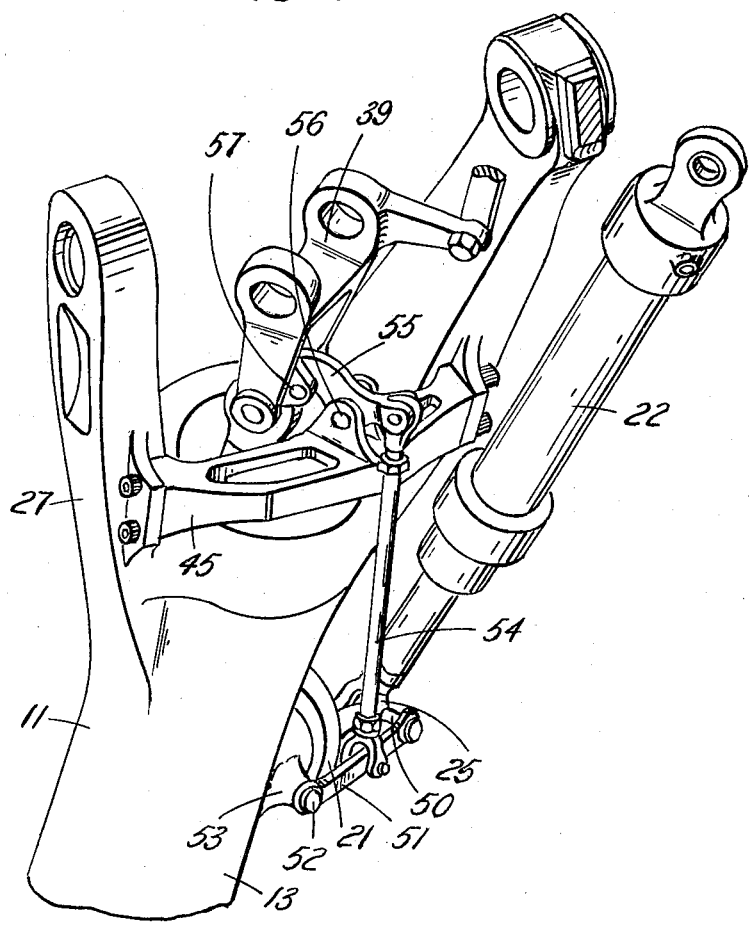

Figure 6 indicates the paths which the components of the crank-and-lever mechanism take during the retraction movement;

Figure 7 is a perspective view of an aircraft incorporating an undercarriage retraction mechanism of the invention; and Figure 8 is a view of the upper part of the undercarriage retraction mechanism, the view being taken in the direction opposite to that in which Figure 3 is taken.

Referring now to the drawings, in Figure 7 there is shown an aircraft 9 having main undercarriages (only one shown) supported under the aircraft wings 10. The main undercarriage leg 11 is intended for forward retraction about a retraction hinge axis 12 and comprises an upper component 13 and a lower component 14 arranged for telescoping sliding movement with respect to the upper component in conventional manner. The lower component 14 carries one or more wheels 15 or other ground engaging elements at its free end and is retrained against rotational movement relatively to the upper component by a scissors linkage 16 of known construction. A shock absorber 17 (see Figures 4 and 6), for example a telescopic damper of the oleo pneumatic type, is connected at its lower end to the lower component 14 in known manner (not shown) while at its upper end the shock absorber 17 is connected at 18 which is a ball joint to an oleo contracting mechanism hereinafter to be described.

A telescopic drag strut 19 (not shown in Figure 1), is provided between the upper component 13 and a point on the aircraft structure forward of the leg, ball connections 20 and 21 being provided at both ends of the drag strut 19 connecting it respectively with the aircraft structure and the upper component 13. A retraction jack 22, for example an hydraulic jack, is disposed between the same point of connection 21 as the drag strut on the upper component 13, and a point 23 (see Figure 2) on the aircraft structure, slightly to the rear and to one side of the leg 11. Ball connections 24 and 25 are provided at either end of the jack 22 and the arrangement of the jack 22 is such that when the leg 11 is retracted the jack is telescopically extended whilst when the leg is lowered the jack 22 is contracted.

The undercarriage leg which has been chosen to be described is outwardly and forwardly raked and is provided with a skewed retraction hinge axis, since this combination of conditions is the most difficult to reconcile with the oleo contraction system.

The oleo contracting mechanism (most clearly shown in Figure 3) is contained partly within the hollow interior of the upper component 13 and partly between the Y-shaped attachment lugs 26 and 27 integral with the upper component.

Integral with the inner of the two attachment lugs 26, is a crank arm 28 outwardly and rearwardly directed radially of the retraction hinge axis. At its free end, the crank arm 28 is connected to one end 34 of a first link 32. The other end of this link 32 is received within a slot 31 in the upper surface of a rocking lever 29, the forward end of which is pivoted at 30 to a fixed point on the aircraft structure, and the link 32 and rocking lever 29 are connected together by means of a ball joint 33. The rearward end of the lever 29 is pivotally connected with one end 35 of a second link 36, the other end of this link 36 being pivotally connected at 37 with the shorter arm 38 of a bell crank lever 39 of wishbone shape. The lever 39 is pivotally mounted at 40 upon a fixed part of the aircraft structure. The longer arm 41 of the bell crank lever 39 which is approximately three times the length of arm 38 is connected by means of a ball joint 42 with a third link 43. Link 43 passes through the hollow interior of the upper component 13 and connects with the upper end of the shock absorber 17 through a ball joint at 18 (see Figures 4 and 5). The cylinder 44 of the shock absorber is a sliding fit in the bore of the upper component 13.

The axes 12, 30 and 40 are all cut by a common line 61 which when the leg is fully extended is coincident with the axis of the upper component and contains the arm 41 and link 43.

At the ball connection 25 between the rod of the jack and the leg, there is provided a slotted lug arrangement 50 (see Figure 8) connecting with a lever 51. This lever is pivotally mounted at 52 upon a boss 53 integral with the upper component 13 of the leg 11. A rod 54 connects the lever 51 with a locking lever 55 pivotally mounted at 56 on a cross beam 45. The cross beam 45 is attached at one of its ends to the rearward face of the attachment lug 26 while the other of its ends is similarly attached to the rearward face of the attachment lug 27. The lever 55 is arranged to engage a pin 57 carried by the bell crank lever 39 to lock the crank and lever mechanism rigid when the leg 11 is fully extended. Upon retraction of the jack 22 the slotted lug arrangement 50 affords initial free motion to displace the lever 51 to cause unlocking of the lever 39, this occurring before actual lifting of the leg 11 by the jack.

The telescopic drag strut is provided with internal locking means operative upon full extension and full retraction of the leg. Release of such locking means may be initiated mechanically, hydraulically (in association with the retraction jack 22), or electrically, in known manner.

With the undercarriage in the lowered position as shown in Figures 1, 2, 3 and 4 of the drawings, the bell crank lever 39, third link 43 and shock absorber 17 lie on the centre line of the leg 11 (see in particular Figure 4), the assembly being locked to the beam 45 across the Y frame formed on the upper end of the upper component 13.

When retraction is selected, the lock associated with the contracting mechanism is released by free travel of the retraction jack 22. At the same time the down lock within the drag strut is automatically released. As the retraction jack 22 is extended and the leg 11 commences to move upwardly about its hinge axis 12, the crank 28 which is integral with the arm 26 is thus also angularly displaced about the hinge axis 12. Through the linkage comprising the first link 32, rocking lever 29, second link 36 and bell crank lever 39, this movement is magnified so that the total angular movement of the bell crank 39 around its own pivot 40 is approximately three times that of the leg 11, and in the same direction as the leg 11.

Owing to the non-linear velocity ratio and the disposition of the bell crank lever pivot 40 relative to the retraction hinge axis 12, the path of the ball joint 42 of the bell crank lever 39 does not depart to any great extent from the centre line of the upper component 13 during its retraction. Thus the third link 43 is contained almost entirely within the confines of the upper component casing. In a view of the assembly down the centre line of the upper component 13 it is seen that the angular relationship of the retraction pivot axis 12 and the bell crank pivot axis 40 determines that the lower connection 42 of the bell crank lever does not depart greatly from the leg centre line in the aircraft transverse plane.

In Figure 4 the chain-dotted line shows the path of the connection 42 and of the bell crank lever 39 relative to the leg 11 during the retraction cycle. This is illustrated by considering the leg fixed in space and rotating the aircraft, and the contracting mechanism with it, round the undercarriage hinge axis 12, in the reverse direction. The component parts thus have the same relationship to each other and the movement relative to the leg can immediately be seen. It will be noted how closely to the leg centre line the connection 42 remains during the retraction cycle, the extent of deviation in the example being described being such as to require only a small scallop 46 in the upper rim 47 of the upper component 13 to accommodate the third link 42 in its worst clearance position relative to upper component 73 (as shown in chain-dotted lines).

The final retracted position of the mechanism is such that the connection 42 is located approximately opposite to the retracted leg 11 with respect to the hinge axis 12 (see chain-dotted lines in Figure 5) so that the leg sliding assembly is contracted by an amount 62 (see Figure 4) approximately equal to the sum of the length of the longer arm 41 of the bell crank lever and the length of displacement of the bell crank lever pivot axis 40 from the hinge axis 12.

It will be understood that the undercarriage contraction mechanism, hereinbefore described, may be conveniently combined with conventional centering and steering means for application of the mechanism to nose wheel undercarriages. Provision would then be made to connect the steering linkage to the lower component of the undercarriage leg through any known mechanism.

It will also be understood that the axes 30 and 40 are not necessarily mutually parallel, nor parallel to the retraction hinge axis 12.

I claim:

1. An aircraft undercarriage including a leg which comprises an upper component, one end of which is adapted to form part of a retraction hinge upon an aircraft, a lower component adapted to carry a landing element, this lower component being mounted for guided longitudinal displacement with respect to said upper component, at least one pair of crank members, each crank member being adapted to be pivotally mounted on fixed structure of the aircraft and a connecting link pivoted to and extending between said pair of crank members, which connecting link is pivoted to one crank member at a radius from the pivot axis of that crank member which is greater than the radius from the pivot axis of the other crank member at which the connecting link is pivoted to the other crank member so that when the crank members are pivotally mounted on the fixed structure of an aircraft and one of the crank members is caused to pivot, then the other crank member of the pair moves through a greater angle than the one crank member, and wherein the crank member arranged to have the least angular movement is connected to move with the upper component of the leg and the crank member arranged to have the greatest angular movement is connected to the lower part of the leg to move it with respect to the upper component of the leg.

2. An aircraft undercarriage including a leg which comprises an upper component, one end of which is adapted to form part of a retraction hinge upon an aircraft, a lower component adapted to carry a landing element, this lower component being mounted for guided longitudinal displacement with respect to said upper component, first, second and third crank members, each crank member being adapted to be pivotally mounted on a fixed structure of the aircraft a first connecting link pivoted to and extending between the first and second crank members and a second connecting link pivoted to and extending between the second and third crank members, the first connecting link being pivoted to the first crank member at a radius from the pivot axis of said first crank member which is greater than the radius from the pivot axis of said second crank member at which said first connecting link is pivoted, and the second connecting link being pivoted to said second crank member at a radius from the pivot axis of said second crank member which is greater than the radius from the pivot axis of said third crank member at which said second connecting link is pivoted and which is greater than the radius from the pivot axis of the second crank member at which said first connecting link is pivoted, so that when the crank members are pivotally mounted on the fixed structure of an aircraft and the first crank member is caused to pivot, the second crank member moves through a greater angle than the first crank member and the third crank member moves through a greater angle than the second crank member, and wherein the first crank member is connected to move with the upper component of the leg and the third crank member is connected to the lower part of the leg to move it with respect to the upper component of the leg.

3. An aircraft undercarriage including a leg which comprises an upper component, one end of which is adapted to form part of a retraction hinge upon an aircraft, a lower component adapted to carry a landing element, this lower component being mounted for guided longitudinal displacement with respect to said upper component, and a crank and lever mechanism comprising a crank formed integrally with the upper end of the upper component and projecting therefrom radially with respect to the retraction hinge axis; a first rocking lever arranged and adapted to be connected at one end with a fixed part of the aircraft structure to pivot about a first axis which is different from the retraction hinge axis; a first link pivotally connected at one end with the radial outer end of said crank and, at its other end, to the first rocking lever at a point intermediate the ends of the first rocking lever; a second link one end of which is pivotally connected with the end of said first rocking lever remote from the first axis; a second rocking lever in the form of a bell crank adapted and arranged to be connected near its centre to a fixed part of the aircraft structure to pivot about a second axis, which is different from the retraction hinge axis and the first axis, one end of said second rocking lever being pivotally connected with the end of said second link remote from the first locking lever and the other end of said rocking lever which is more remote from the second axis than said one end being connected to a third link, which in turn is connected to the upper end of the lower part of the leg.

4. An aircraft undercarriage as claimed in claim 3 further comprising shock absorber means and wherein the third link is connected to the lower part of the leg through the shock-absorber means.

5. An aircraft undercarriage as claimed in claim 4 wherein the upper component is hollow and the shock absorber means comprises a telescopic damper which passes through the interior of said upper component, the damper being displaceable within and relatively to the upper component under the control of the crank-and-lever mechanism during retraction.

6. An aircraft undercarriage as claimed in claim 4 wherein, there is one point in each of the retraction axis and the second axis which lies on a common line, and the points in the axes about which the third link pivots relative to the second rocking arm and the lower component respectively also lie along the common line when the undercarriage is extended, and wherein the longer arm of the second rocking lever is connected to the shock absorber means and the common line is coincident with the axis of the shock absorbing means.

7. An aircraft undercarriage as claimed in claim 3, wherein there is one point in each of the retraction axis and the second axis which lies on a common line, and the points in the axes about which the third link pivots relative to the second rocking arm and the lower component respectively also lie along the common line when the undercarriage is extended.

8. An aircraft undercarriage as claimed in claim 3 wherein the first link is connected to the first rocking lever and the second link is connected to the second rocking lever each through a universal joint.

9. An aircraft undercarriage as claimed in claim 3 further comprising locking means connected to the crank-and-lever mechanism to lock the latter in position when the undercarriage is extended.

10. An aircraft undercarriage as claimed in claim 3 further comprising a retraction motor adapted for connection between the upper component and fixed structure of the aircraft.

11. An aircraft including an aircraft undercarriage comprising a ground engaging member; a leg having an upper component and a lower component, the said leg upper component being connected to the aircraft to pivot relatively thereto about a retraction hinge axis, and said leg lower component carrying said ground engaging member and being mounted for guided longitudinal displacement with respect to said leg upper component; at least one pair of crank members each crank member being pivotally mounted on the aircraft; and a connecting link pivoted to and extending between said pair of crank members, which connecting link is pivoted to one crank member at a radius from the pivot axis of that crank member which is greater than the radius from the pivot axis of the other crank member at which the connecting link is pivoted to the other crank member so that when one of the crank members is caused to pivot, then the other crank member of the pair moves through a greater angle than the said one crank member, and wherein the crank member arranged to have the least angular movement is connected to move with the upper component of the leg and the crank member arranged to have the greatest angular movement is connected to the lower part of the leg to move it with respect to the upper component of the leg.

12. An aircraft including an aircraft undercarriage, a ground engaging member; a leg having an upper component and a lower component, the said leg upper component being connected to the aircraft to pivot relatively thereto about a retraction hinge axis, and said leg lower component carrying said ground engaging member and being mounted for guided longitudinal displacement with respect to said leg upper component; and a crank-and-lever mechanism; wherein the crank-and-lever mechanism comprises a crank formed integrally with the upper end of the upper component and projecting therefrom radially with respect to the retraction hinge axis; a first rocking lever connected at one end of the aircraft structure to pivot about a first axis, which is different from the retraction hinge axis; a first link pivotally connected at one end with the radial outer end of said crank and, at its other end to the first rocking lever at a point intermediate the ends of the first rocking lever; a second link one end of which is pivotally connected with the end of said first rocking lever remote from the first axis; a second rocking lever; a third link in the form of a bell crank connected near its centre to the aircraft structure to pivot about a second axis, which is different from the retraction hinge axis and the first axis, one end of said second rocking lever being pivotally connected with the end of said second link remote from the first rocking lever and the other end of said second rocking lever, which is more remote from the second axis than said one end, being connected to the third link; said third link being connected in turn to said lower component.

13. An aircraft as claimed in claim 12 further comprising a retraction jack connected at one end to the upper component and at its other end to the aircraft; and locking means connected to the crank-and-lever mechanism and, with limited lost motion, to the retraction jack to lock the crank-and-lever mechanism when the leg is extended.

14. An aircraft as claimed in claim 12 in which there is one point in each of the retraction axes, and the second axis which lies on a common line.

15. An aircraft as claimed in claim 14 wherein there is one point in each of the retraction axes, and the second axis which lies on a common line, and points in the axes about which the third link pivots relative to the second rocking arm and the lower component respectively also lie along this common line when the undercarriage is extended.

16. An aircraft including an aircraft undercarriage, a ground engaging member; a leg having an upper component and a lower component, the said leg upper component being connected to the aircraft to pivot relatively thereto about a retraction hinge axis, and said leg lower component carrying said ground engaging member and being mounted for guided longitudinal displacement with respect to said leg upper component; shock absorber means connected to the lower component and a crank-and-lever mechanism which comprises a crank formed integrally with the upper end of the upper component and projecting therefrom radially with respect to the retraction hinge axis; a first rocking lever connected at one end with the aircraft structure to pivot about a first axis, which is different from the retraction hinge axis; a first link pivotally connected at one end with the radial outer end of said crank and, at its other end, to the first rocking lever at a point intermediate the ends of the first rocking lever, a second link one end of which is pivotally connected with the end of said first rocking lever remote from the first axis; a second rocking lever, a third link, in the form of a bell crank connected near its centre to the aircraft structure to pivot about a second axis, which is different from the retraction hinge axis and the first axis, one end of said second rocking lever being pivotally connected with the end of said second link remote from the first rocking lever and the other end of said second rocking lever being connected to the third link at a point more remote from the second axis than is the point of connection between the said one end of the second rocking lever and said second link, said third link being connected in turn to said shock absorber means.

17. An aircraft including an aircraft undercarriage comprising a ground engaging member; a leg having an upper component and a lower component, the said leg upper component being connected to the aircraft to pivot relatively thereto about a retraction pivot axis, and said leg lower component carrying said ground engaging member and being mounted for guided longitudinal displacement with respect to said upper component, first, second and third crank members each crank member being pivotally mounted on the aircraft; a first connecting link pivoted to and extending between the first and second crank members and a second connecting link pivoted to and extending between the second and third crank members, the first connecting link being pivoted to the first crank member at a radius from the pivot axis of said first crank member which is greater than the radius from the pivot axis of said second crank member at which said first connecting link is pivoted, and the second connecting link being pivoted to said second crank member at a radius from the pivot axis of said second crank member which is greater than the radius from the pivot axis of said third crank member at which said second connecting link is pivoted and which is greater than the radius from the pivot axis of the second crank member at which said first connecting link is pivoted, so that when the first crank member is caused to pivot, the second crank member moves through a greater angle than the first crank member and the third crank member moves through a greater angle than the second crank member, and wherein the first crank member is connected to move with the upper component of the leg and the third crank member is connected to the lower part of the leg to move it with respect to the upper component of the leg.

References Cited in the file of this patent

UNITED STATES PATENTS

| | | |
|---|---|---|
| 2,550,028 | Wells | Apr. 24, 1951 |
| 2,621,004 | Ashton | Dec. 9, 1952 |

FOREIGN PATENTS

| | | |
|---|---|---|
| 527,456 | Great Britain | Oct. 9, 1940 |
| 568,365 | Great Britain | Mar. 30, 1945 |
| 732,203 | Germany | Feb. 24, 1943 |
| 996,613 | France | Feb. 24, 1954 |